(12) United States Patent
Marsden

(10) Patent No.: US 11,357,328 B2
(45) Date of Patent: Jun. 14, 2022

(54) FURNITURE SECURING DEVICE

(71) Applicant: Elbee Pty Ltd., Bondi Junction (AU)

(72) Inventor: Andrew Marsden, Hingham, MA (US)

(73) Assignee: Elbee Pty Ltd., Bondi Junction (AU)

( * ) Notice: Subject to any disclaimer, the term of this patent is extended or adjusted under 35 U.S.C. 154(b) by 25 days.

(21) Appl. No.: 16/646,857

(22) PCT Filed: Sep. 12, 2018

(86) PCT No.: PCT/IB2018/001142
§ 371 (c)(1),
(2) Date: Mar. 12, 2020

(87) PCT Pub. No.: WO2019/053510
PCT Pub. Date: Mar. 21, 2019

(65) Prior Publication Data
US 2021/0007485 A1    Jan. 14, 2021

Related U.S. Application Data

(60) Provisional application No. 62/558,853, filed on Sep. 14, 2017.

(51) Int. Cl.
*A47B 97/00* (2006.01)
*F16M 13/02* (2006.01)

(52) U.S. Cl.
CPC ........... *A47B 97/00* (2013.01); *F16M 13/022* (2013.01); *A47B 2097/008* (2013.01)

(58) Field of Classification Search
CPC ............. A47B 97/00; A47B 2097/008; F16M 13/022; B60P 7/0815

(Continued)

(56) References Cited

U.S. PATENT DOCUMENTS 3,409,264 A * 11/1968 Schwiebert ........... B60P 7/0815
410/103
3,696,759 A * 10/1972 Parris .................... B60P 7/0807
410/105

(Continued)

FOREIGN PATENT DOCUMENTS

CN            3239722        6/2002
CN       206166322 U   *  5/2017

(Continued)

OTHER PUBLICATIONS

[No. Author Listed] Product Listing for Bebe Earth—Furniture and TV Anti-Tip Straps (8-Pack) for Baby Proofing and Child Protection—Adjustable Wall Anchor Safety Kit—Secure Cabinets and Bookshelf from Falling—Parent (White). Amazon.com. https://www.amazon.com/Furniture-Anti-Tip-Straps-Childproofing-Included/dp/B014R5XIDY/. Publicly available at least as early as Jun. 6, 2019, 11 pages.

(Continued)

*Primary Examiner* — Todd M Epps
(74) *Attorney, Agent, or Firm* — Wolf, Greenfield & Sacks, P.C.

(57) ABSTRACT

A furniture securing system includes abase attachable to a wall, abase attachable to a piece of furniture, and a connector connected to both bases to help prevent tipping of a piece of furniture. One or both of the bases include a pivotable attachment element that attaches the connector to the base. By allowing pivoting of the attachment element, the force from the connector when the furniture pulls on the connector orients the attachment element along the same direction as the force. The system may include limited parts, a low profile, and have a straightforward assembly. The base may limit the total pivot sweep angle of the attachment element.

21 Claims, 11 Drawing Sheets

(58) Field of Classification Search
USPC .................................. 248/499, 500, 501
See application file for complete search history.

(56) References Cited

U.S. PATENT DOCUMENTS

| | | | |
|---|---|---|---|
| 4,850,769 A * | 7/1989 | Matthews | B60P 7/0815 |
| | | | 410/105 |
| 5,052,869 A | 10/1991 | Hansen, II | |
| 5,248,176 A | 9/1993 | Fredriksson | |
| 5,320,193 A | 6/1994 | Bongiovanni et al. | |
| D399,804 S | 10/1998 | Lindenman et al. | |
| 5,983,573 A | 11/1999 | MacKarvich | |
| 6,138,975 A | 10/2000 | McDaid | |
| 6,161,883 A | 12/2000 | Pearl | |
| 6,202,977 B1 | 3/2001 | Chapman | |
| 6,220,562 B1 | 4/2001 | Konkle | |
| 6,398,447 B1 | 6/2002 | Pearl | |
| D512,903 S | 12/2005 | Gallien | |
| 7,025,321 B2 | 4/2006 | Jung | |
| 7,086,815 B2 | 8/2006 | Bruns | |
| 7,175,149 B2 | 2/2007 | Gallien | |
| 7,686,551 B2 | 3/2010 | Grasso | |
| 7,740,218 B2 | 6/2010 | Green | |
| 8,066,245 B2 | 11/2011 | Green | |
| 8,235,345 B2 | 8/2012 | Sadil et al. | |
| 8,262,045 B2 | 9/2012 | Green | |
| 8,720,846 B2 | 5/2014 | Wohlford et al. | |
| 8,740,172 B2 | 6/2014 | Essrig | |
| D791,575 S | 7/2017 | Hochman | |
| D863,040 S | 10/2019 | DeDios-Shirley et al. | |
| 2004/0046092 A1 | 3/2004 | Jung | |
| 2004/0051013 A1 | 3/2004 | Risdall | |
| 2004/0113039 A1 | 6/2004 | Becker | |
| 2005/0023419 A1 | 2/2005 | Frankel | |
| 2006/0097123 A1 | 5/2006 | Gallien | |
| 2007/0284503 A1 | 12/2007 | Kirkpatrick | |
| 2008/0260487 A1 | 10/2008 | Grasso | |
| 2013/0087675 A1 | 4/2013 | Miller | |
| 2016/0362899 A1 | 12/2016 | Kruger et al. | |
| 2017/0164738 A1 | 6/2017 | Clements | |
| 2018/0008044 A1 | 1/2018 | Holt | |
| 2020/0324714 A1 | 10/2020 | Greely et al. | |

FOREIGN PATENT DOCUMENTS

| | | |
|---|---|---|
| CN | 206166322 U | 5/2017 |
| DE | 3923691 C1 | 5/1990 |
| EP | 2 363 553 A1 | 9/2011 |
| GB | 2471315 A | 12/2010 |
| GB | 6090468 | 5/2020 |
| JP | S55-122654 U | 9/1980 |
| JP | S57-111247 U | 7/1982 |
| JP | 3038091 U | 6/1997 |
| JP | 3047859 U | 4/1998 |
| JP | 3112455 U | 8/2005 |
| JP | 3122931 U | 6/2006 |
| KR | 1998-0018401 U | 7/1998 |
| KR | 10-0888211 B1 | 3/2009 |

OTHER PUBLICATIONS

[No. Author Listed] Little Chicks, Hinged Furniture Anchors. Amazon.com. https://www.amazon.com/Little-Chicks-Hinged-Furniture-Anchors/dp/B07MHCFTQN/ref=sr_1_101?dchild=1&keywords=wall+mount+for+securing+furniture&qid=1608741698&sr=8-101, as accompanying the Dec. 31, 2020 Office Action in U.S. Appl. No. 29/683,693 with the retrieval date provided on the PTO-892 as Dec. 23, 2020. 14 pages.
[No Author Listed] Puninoto, Furniture Anchor for Baby Proofing Metal Furniture Wall Straps. Amazon.com. https://www.amazon.com/dp/B0895HSWL2/ref=sspa_dk_detail_O?psc=1&pd_rd_i=BOS95HSWL2&pd_rd_w=Pq36y&pf_rd_p=7d37a48b-2b1a-4373-8c1a-bdcc5da66be9&pd_rd_, as accompanying the Dec. 31, 2020 Office Action in U.S. Appl. No. 29/683,693 with the retrieval date provided on the PTO-892 as Dec. 23, 2020. 11 pages.
[No Author Listed] VatCat, Furniture Straps, Furniture Anchors for Baby Safety Proofing. Amazon.com. https://www.amazon.com/dp/B07W3MC94F/ref=sspa_dk_detail_5?psc=1&pd_rd_i=B07W3MC94F&pdrdw=GUzFM&pfrdp=f0355a48-7e73-489a-, as on PTO-892 accompanying Dec. 31, 2020 office action in U.S. Appl. No. 29/683,693, with retrieval date provided on the PTO-892 as Dec. 23, 2020, and statement on PTO-892, "Date first available Aug. 5, 2019". 13 pages.
[No Author Listed] Mommy's Helper Tip Resistant Furniture Safety Brackets. Amazon.com. https://www.amazon.com/Mommys-Helper-Resistant-Furniture-Brackets/dp/B00081MHJI?th=1. Publicly available at least as early as May 22, 2018, 8 pages.
[No Author Listed] Product Listing for Quakehold! 2830 Furniture Cable, 7-inch. Amazon.com. https://www.amazon.com/Quakehold-2830-7-Inch-Steel-Furniture/dp/B000FJQQKO. Publicly available at least as early as May 22, 2018, 8 pages.
[No Author Listed] Product listing for WENWELL 2PCS Furniture Anti-Tip Metal Kit Global Steel Cables Furniture Anti-Tip Anchor Straps for Baby Safety, Heavy Duty Straps Wall Anchoring Kit, with Mounting Hardware Included. https://www.amazon.com/WENWELL-Furniture-Anti-Tip-Anchoring-Mounting/dp/B07X5G73C4/ref=sr 1 fkmr0 l?keywords=wenwell+2pc+furniure+anti-tip+metal+kit&qid=1573152212&sr=8-1-fkmr0, Publicly available at least as early as Sep. 11, 2018, 6 pages.
[No Author Listed] Product Listing for Baby Safety Anti Tip Furniture Straps, Anchor Furniture TV Straps Safety & 4 Child Safety Lock—Dwarm All Metal Part. Amazon.com. https://www.amazon.com/Safety-Furniture-Straps-Anchor-TV/dp/B072HH3JK6/ref=pd_sbs_75_4?_encoding=UTF8&refRID=E9PTNM5SHRJ2FFH6Y5ZM&th=1. Publicly available at least as early as May 22, 2018, 5 pages.
[No Author Listed] Product Listing for Skyla Homes—TV and Furniture Anchors (10-Pack) Anti Tip Wall Mount Straps for Baby Proof Safety, Best Adjustable Earthquake Resistant Strap, Safe Dresser n Bookshelf Child Proofing, Extra Secure Kit. https://www.amazon.com/Ellas-Furniture-Adjustable-Earthquake-Protection/dp/B06VY8HBPH/. Publicly available at least as early as Sep. 11, 2018, 10 pages.
[No Author Listed] Safety 1st Décor Multi-Purpose Appliance Lock. ToysRUs. 2 pages.
[No Author Listed] Product listing for Furniture Safety Straps Kit—Anti-Tip Anchor for Any TV, Extra Strong Wall Hold—2 Pack White Earthquake Proof—Baby Childproofing Strap Light & Heavy Anchors—Bolts & Hardware Included. Amazon.com. https://www.amazon.com/dp/B072DVHNTX?psc=1. Publicly available at least as early as Sep. 11, 2018, 6 pages.
International Search Report and Written Opinion for International Application No. PCT/IB2018/001142, dated Dec. 21, 2018.
[No Author Listed] Mommy's Helper Tip Resistant Furniture Safety Brackets. Amazon.com. https://www.amazon.com/Mommys-Heloer-Resistant-Furniture-Brackets/dp/B00081MHJI?th=1. Publicly available at least as early as Sep. 14, 2017, 8 pages.
[No Author Listed] Product Listing for Baby Safety Anti Tip Furniture Straps, Anchor Furniture TV Straps Safety & 4 Child Safety Lock—Dwarm All Metal Part. Amazon.com. https://www.amazon.com/Safety-Furniture-Staps-Anchor-TV/dp/B072HH3YK6/ref=pd_sbs_75_4?_encoding=UTF8&refRID=E9PTNM5SHR2FFM6Y5ZM&th=1. Publicly available at least as early as Sep. 14, 2017, 5 pages.
[No Author Listed] Product Listing for Furniture Safety Straps Kit—Anti-Tip Anchor for Any TV, Extra Strong Wall Hold—2 Pack White Earthquake Proof—Baby Childproofing Strap Light & Heavy Anchors—Bolts & Hardware Included. Amazon.com. https://www.amazon.com/dp/B072DVHNTX?psc=1. Publicly available at least as early as. Sep. 14, 2017, 6 pages.
[No Author Listed] Product Listing for Skyla Homes—TV and Furniture Anchors (10-Pack) Anti Tip Wall Mount Straps for Baby Proof Safety, Best Adjustable Earthquake Resistant Strap, Safe Dresser n Bookshelf Child Proofing, Extra Secure Kit. https://www.

(56) References Cited

OTHER PUBLICATIONS amazon.com/Ellas-Furniture-Adjustable-Earthquake-Protection/dp/B06VY8HBPH/. Publicly available at least as early as Sep. 14, 2017, 10 pages.

[No Author Listed] Product Listing for Quakehold! 2830 Furniture Cable, 7-inch. Amazon.com. httos://www.amazon.com/Quakebold-2830.7-Inch-Steel-Furniure/dp/B000FJQQKO. Publicly available at least as early as Sep. 14, 2017, 8 pages.

[No Author Listed] Product listing for Wenwell 2PCS Furniture Anti-Tip Metal Kit Global Steel Cables Furniture Anti-Tip Anchor Straps for Baby Safety, Heavy Duty Straps Wall Anchoring Kit, with Mounting Hardware Included. https://www.amazon.com/WENWELL-Furniture-Anti-Tip-Anchoring-Mounting/dp/B07X5G73C4/ref=sr_1_fkmr0_1 ?keywords=wenwell+2pc-+furniure+anti-tip+metal+kit&qid=1573152212&sr=8-1-fkmr0, Publicly available at least as early as Sep. 14, 2017, 6 pages.

Extended European Search Report for European Application No. 18857075.8, dated May 7, 2021.

* cited by examiner

FURNITURE SECURING DEVICE

CROSS-REFERENCE TO RELATED APPLICATIONS

This application is a national stage filing under 35 U.S.C. 371 of International Patent Application No. PCT/IB2018/001142, filed Sep. 12, 2018, which claims the benefit under 35 U.S.C. § 119(e) to U.S. Provisional Application Ser. No. 62/558,853, filed on Sep. 14, 2017 and entitled "FURNITURE SECURING DEVICE," each of which is herein incorporated by reference in its entirety.

FIELD

The disclosed embodiments are directed to methods and devices for securing pieces of furniture to a surface, such as a wall.

DISCUSSION OF THE RELATED ART

Furniture securing devices are known for preventing pieces of furniture from tipping over. Typically a first plate is attached to a wall and a second plate is attached the back of a piece of furniture. A cord is attached to each of the plates to keep the furniture from tipping when a force is applied to the furniture.

SUMMARY

According to one embodiment, a furniture securing system includes a connector and a first base arranged to be mounted to a first surface, the first base including a first attachment element adapted to hold a first end of the connector. The system includes a second base arranged to be mounted to a second surface, the second base including a second attachment element adapted to hold a second end of the connector. The first attachment element pivots relative to the first base, and the first attachment element has a total pivot swing angle of 150 degrees or less.

According to another embodiment, a furniture securing assembly includes a first baseplate adapted to be mounted to a first surface, and a first attachment element pivotally attached to the first baseplate. The first attachment element includes first and second pins that engage with corresponding first and second recesses on the baseplate to attach the first attachment element to the baseplate. The system also includes a second baseplate adapted to be mounted to a second surface, and a second attachment element attached to the second baseplate. A connector is attachable to each of the first and second attachment elements.

According to a further embodiment, a method of assembling a furniture securing device is provided. The device has a baseplate and an attachment element pivotally attached to the baseplate, the baseplate having a wall-facing side and an outward-facing side. The method includes inserting the attachment element through an opening in the wall-facing side from back to front such that a portion of the attachment element protrudes from the outward-facing side of the baseplate. The method also includes engaging a first hinge member of the attachment element with a corresponding first second hinge member of the baseplate.

According to yet another embodiment, a furniture securing device includes a connector, and a first base arranged to be mounted to a first surface, the first base including a first attachment element adapted to hold a first end of the connector. The device also includes a second base arranged to be mounted to a second surface, the second base including a second attachment element adapted to hold a second end of the connector. The first attachment element includes a first pin that pivots relative to the first base.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As is known, furniture securing devices are used to secure pieces of furniture to a surface, such as a wall, to help prevent the furniture from moving and/or tipping over. For example, furniture securing devices may be used to secure pieces of furniture in a child's room to help prevent the furniture from falling if the child climbs on to the furniture.

Applicant has recognized that some furniture securing devices may not sufficiently handle dynamic loads when a piece of heavy furniture starts to tip. For example, in anti-tip devices that have a cord connected to two plates, Applicant has recognized that the ability of the devices to support a load can depend on the angle of the cord relative one or both of the plates when the load is applied. In one such example, an anti-tip device may break when subjected to a dynamic load and/or twist. Applicant has recognized that advantages may be realized by providing an anti-tip device that has certain pivoting features to accommodate different angles of applied force. According to embodiments of the present disclosure, a furniture securing device includes a baseplate that is mountable to a surface, such as a wall or a piece of furniture, and an attachment element pivotally attached to the base plate. The attachment element attaches a connector such as a strap or a cord to the baseplate. By permitting the attachment element to pivot, a strap under tension will pull on the attachment element and pivot the attachment element to be substantially aligned with the strap. In this manner, the strap pulls along the length of the attachment element rather than pulling on the attachment element at an angle.

While providing a range of pivot angles, the device may limit the angles to which the attachment element may pivot. For example, the attachment element may be limited to pivoting upwardly by 45 degrees above horizontal and downwardly by 45 degrees below horizontal.

Figure 1:
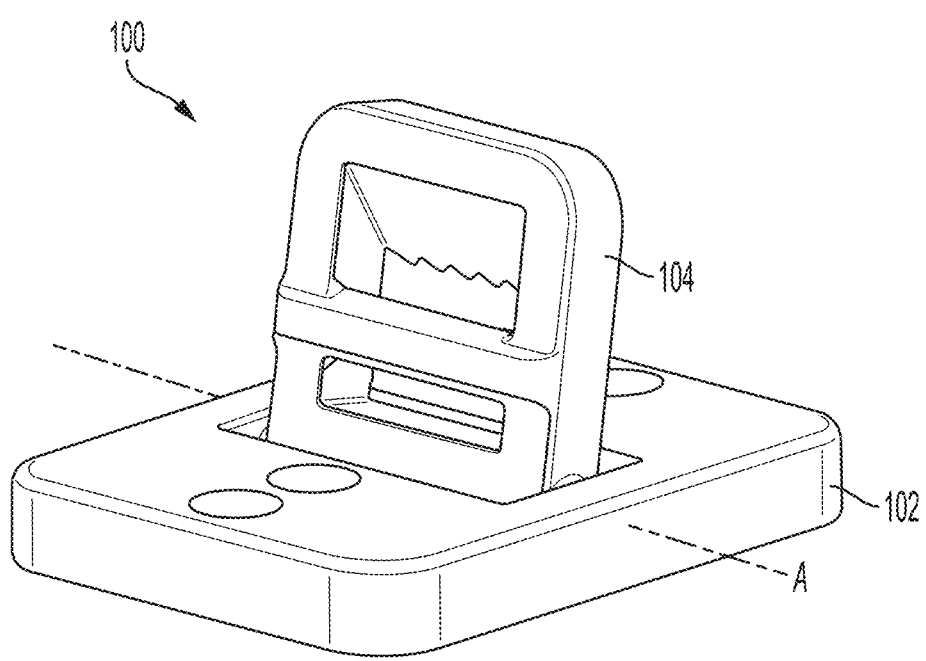
FIG. 1 is a top front perspective view of a furniture securing device according to embodiments of the present disclosure.
Figure 2:
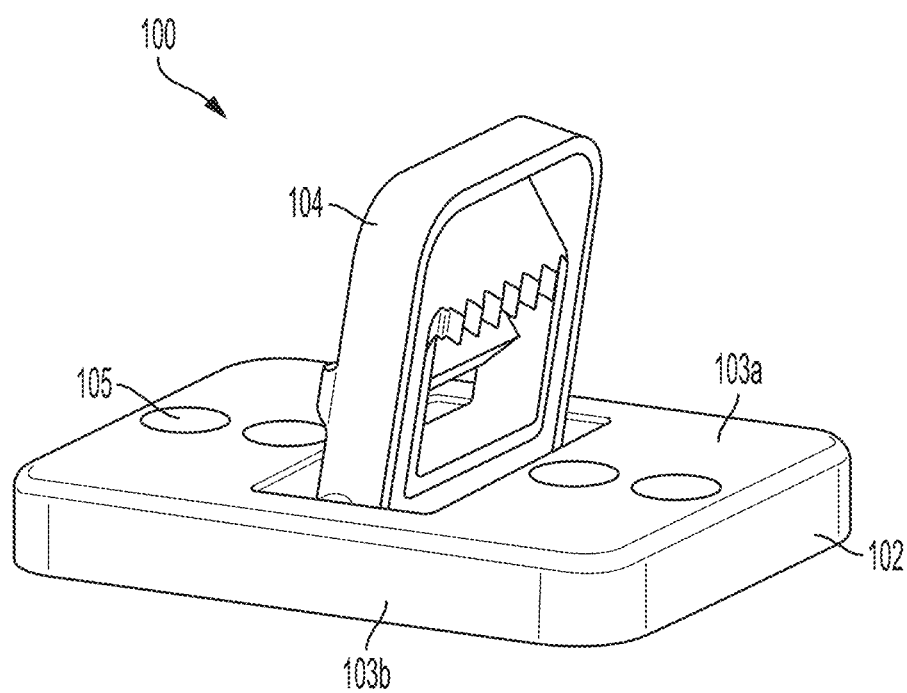
FIG. 2 is a top rear perspective view of the embodiment of FIG. 1.

Turning now to the figures, FIGS. 1 and 2 show a furniture securing device 100 according to embodiments of the present disclosure. As shown in these views, the device includes a baseplate 102 and an attachment element 104 pivotally attached to the baseplate. As will be appreciated, although both the baseplate and attachment element are shown as having substantially rectangular cross-sectional shapes, the baseplate and attachment element may have any suitable shape (e.g., oval, triangular, other polygonal or other suitable shape).

In some embodiments, as shown in FIG. 2, the baseplate 102 includes a front face 103a and four side members 103b. In some embodiments, as shown in FIG. 2, the front face includes one or more openings 105 for mounting the baseplate to a surface, such as to a wall or piece of furniture. In such embodiments, the openings are sized to receive a fastener 109 (see FIG. 7), such as a screw or nail, that is driven into the surface to mount the baseplate to the surface. For example, the openings may be substantially cylindrical in shape to receive a screw.

In some embodiments, to mount the baseplate to the surface, a user may pivot the attachment element out of the way of one or more apertures to insert the fasteners and drive the fasteners into the surface. For example, the attachment element may be pivoted toward a first direction (e.g., toward the apertures on the first side of the attachment element) to allow the user to access the apertures on the second side of the attachment element. In such embodiments, by pivoting the attachment element out of the way of the apertures, the user may be able to more easily position device tool such as a screwdriver or a hammer near the furniture securing device to drive the fasteners into the surface.

Figure 4:
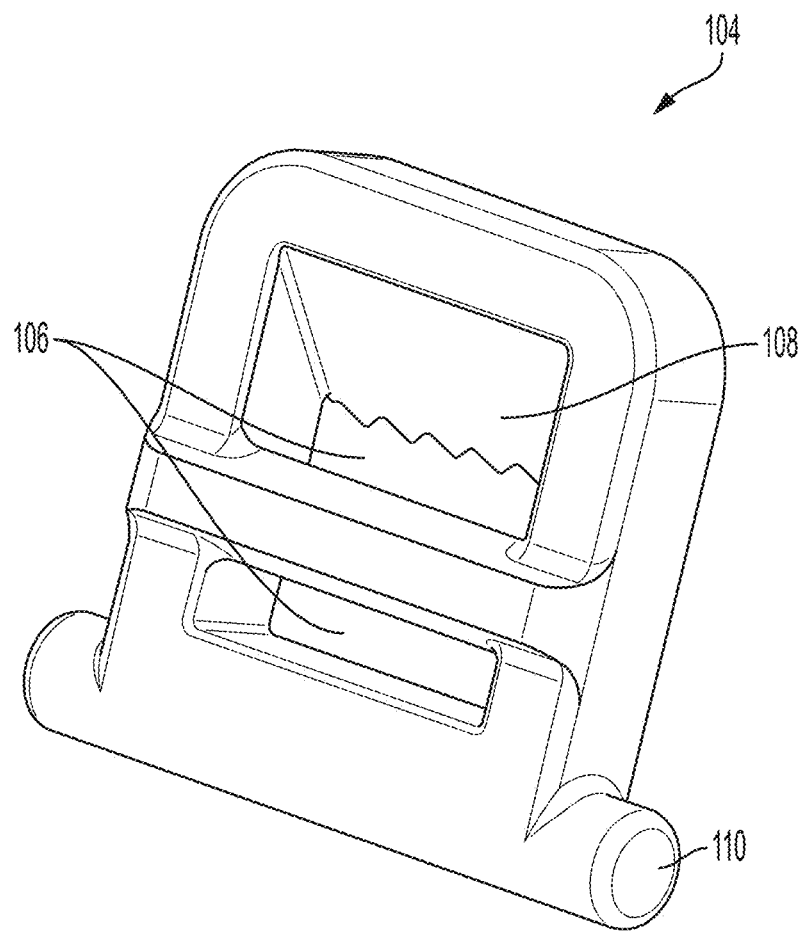
FIG. 4 is a perspective view of an attachment element of a furniture securing device according to one embodiment.

As shown in FIG. 4, the attachment element 104 is arranged to attach a connector such as a strap 107 (see FIGS. 7 and 11) to the baseplate. As shown in this view, the attachment element 104 includes one or more openings 106 through which a strap end may be inserted. In some embodiments, the strap may be woven through the openings to attach the strap to the ae. In such embodiments, one of the openings includes one or more teeth 108 to restrict movement of the strap relative to the attachment element. A first attachment element may be connected to a first end of the connector while a second attachment element is connected to a second end. The term "end", for purposes herein relating to the connector (such as a strap), does not necessarily mean only the extreme end of the connector. For example, a connector attached at a first end to an attachment element may have a portion of the connector that is set back from the extreme end attached to the attachment element, and the arrangement would be considered as having the strap connected at a first end to the attachment element.

Figure 7:
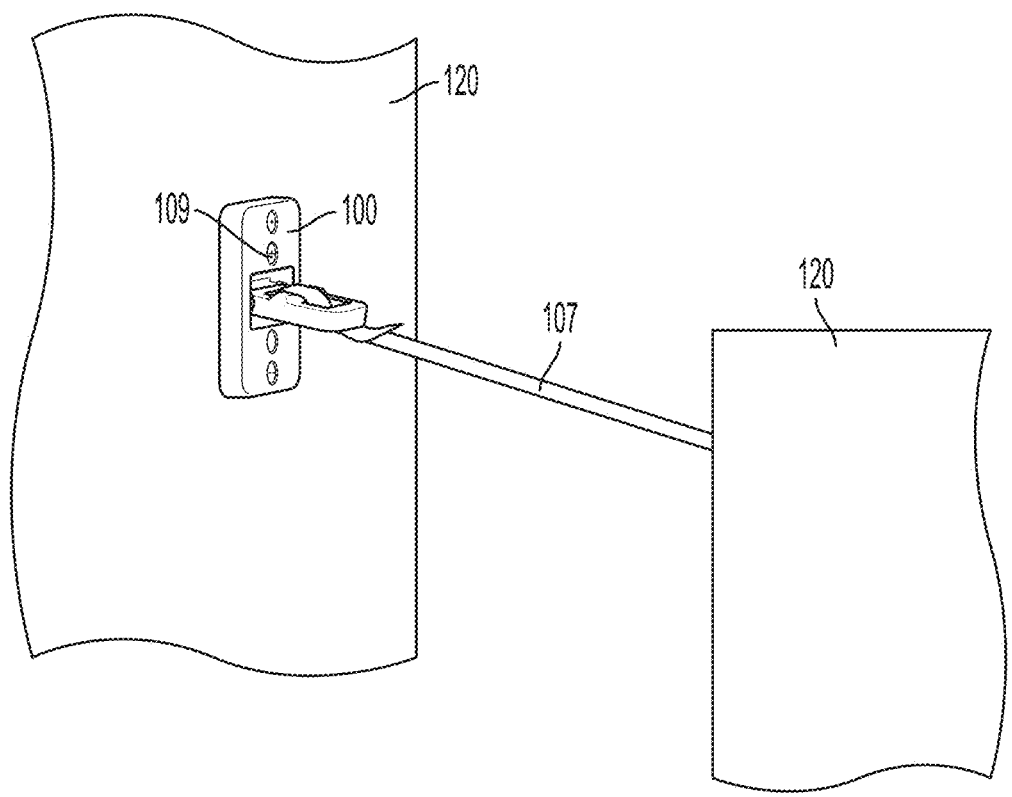
FIG. 7 shows a furniture securing device mounted to a surface according to one embodiment.

Although the strap is shown as being woven through the openings in FIG. 7, it will be appreciated that the strap may be attached to the attachment element in other suitable manners. For example, the strap may be snapped onto the attachment element. The strap also may be sewn around at least a portion of the attachment element. As will be appreciated, the strap may be removably attached to the attachment element or may be permanently attached to the attachment element. In some embodiments, the strap may be integrally formed with the attachment element. Instead of a strap, the connector may be a cord, cable, rope, or any other suitable connector. The connector may be made of plastic in some embodiments and metal in other embodiments.

Figure 5:
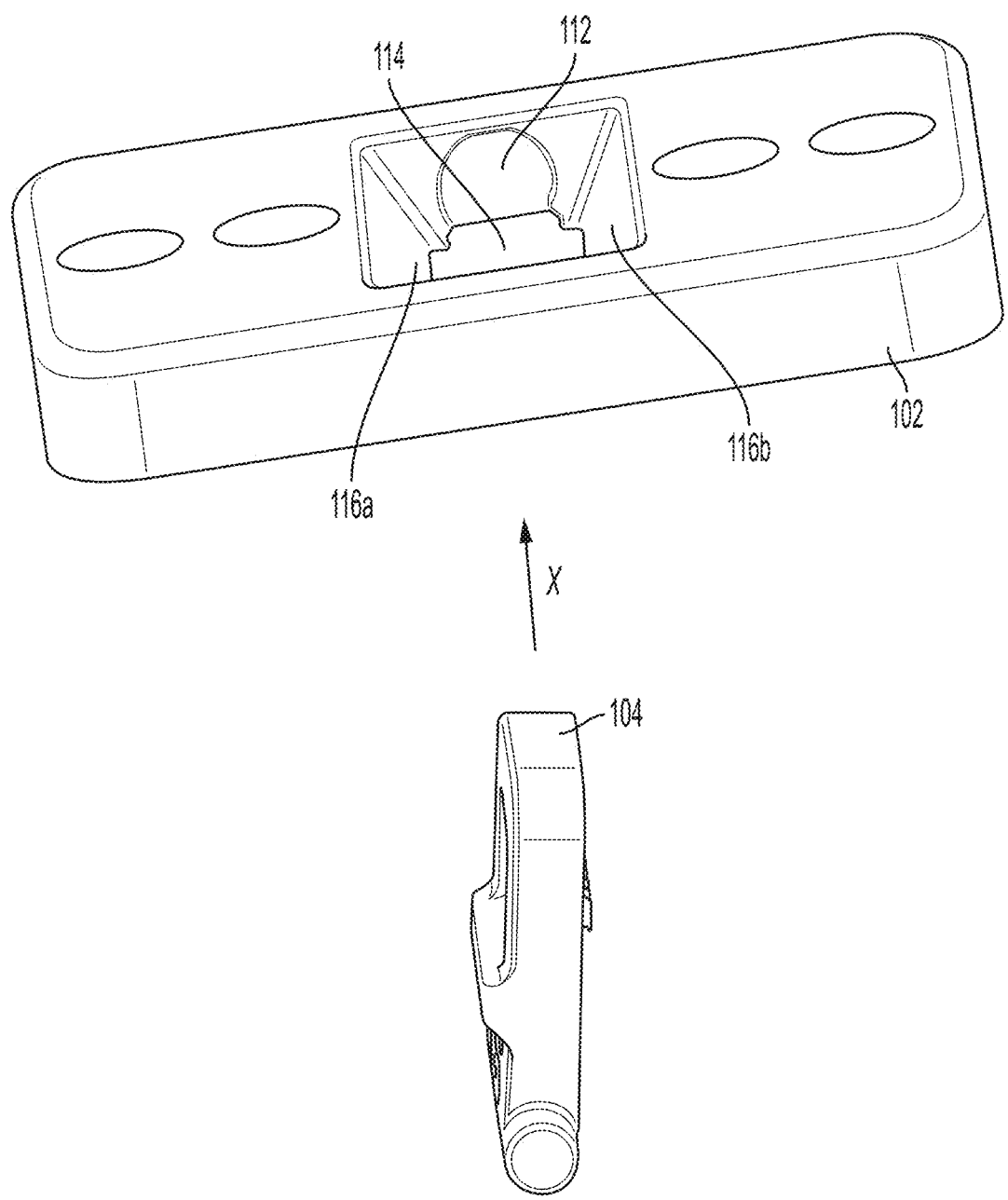
FIG. 5 illustrates an attachment of an attachment element to a baseplate of a furniture securing device.

As shown in FIG. 4, in some embodiments, the attachment element includes one or more pins 110 that extend outwardly from the attachment element body for attaching the attachment element to the baseplate. As shown in this view, the pins may extend outwardly from a bottom side portion of the attachment element. As shown in FIG. 5, in some embodiments, the baseplate 102 includes one or more corresponding channels 112 to receive the pins 110. As shown in FIG. 5, the channels may have a substantially semi-circular cross section, although the channel may have other suitable shapes. In some embodiments, the channels are at least partially formed in the opposite side members of the base plate.

In some embodiments, the pins may have a press-fit or snap-fit engagement with the channels 112 on the baseplate. In some embodiments, the pins may be outwardly biased, with the user pressing inwardly on the pins to move the attachment element into the baseplate and then releasing the pins to engage the pins with the corresponding channels.

Although the attachment elements are shown as having pins that engage with corresponding channels in these views, in other embodiments, the attachment elements may have channels that engage with protrusions on the baseplate. As will be appreciated, the baseplate and attachment element may have other suitable arrangements in other embodiments.

Although the pins are shown as being substantially cylindrical in shape, the pins may have any suitable shape. For example, the pins may be substantially semi-hemispherical in other embodiments. As will be appreciated, the shape and size of the pins corresponds to the shape and size of the corresponding channels.

In some embodiments, the baseplate includes a recess 114 within which at least a portion of the attachment element is pivotable. As shown in FIGS. 1, 2 and 5, in some embodiments, the recess 114 is at least partially formed in the front face of the baseplate. In some embodiments, the recess is centered laterally and/or top to bottom with respect to the baseplate. As will be appreciated, the recess may be positioned at other suitable locations on the baseplate.

In some embodiments, as shown in FIG. 5, to attach the attachment element to the baseplate, the attachment element is inserted through an opening in the back side the baseplate from front to back (see arrow X). In such embodiments, the attachment element is passed up and through the back of the recess 114 until the pins 110 reach the corresponding channels 112. The pins are then engaged with the corresponding channels, as previously described, to attach the attachment element to the baseplate. In some embodiments, as shown in FIGS. 1 and 7, when the furniture securing device is mounted to the surface, the front face 103a of the baseplate is positioned outwardly of the engagement between the pins and corresponding channels. In such embodiments, once the furniture securing device is mounted to a surface, the attachment element is not removable from the baseplate.

Such an arrangement may provide ease of manufacturing and/or assembly. For example, an attachment element manufactured and assembled in this manner can be made of only two pieces in some embodiments. Each of the attachment element and the baseplate may be made of injection molded plastic and then snapped together or otherwise assembled. Additionally, by positioning the baseplate opening (for the attachment element pins) on the back side of the baseplate, the pins are secured within the baseplate when the baseplate is mounted to the wall or a piece of furniture. The direction of force on the attachment element when preventing tipping is toward the front of the baseplate which may have no openings or path for the pins to leave the baseplate.

According to some embodiments herein, the particular arrangements of the baseplate and attachment element allow for a low profile device. That is, the device may be mounted to a wall or a piece of furniture and protrude by a half inch or less in some embodiments.

As will be appreciated, the attachment element may be attached to the baseplate in other suitable manners. For example, the attachment element may be fed into a top of the recess for attaching the attachment element to the baseplate (e.g., by engaging the attachment element protrusions with the baseplate channels). In such embodiments, the user may first attach the baseplate to the surface (e.g., via the one or more fixing elements) and then attach the attachment element to the baseplate. As with other embodiments, the attachment element may not be removable from the baseplate once the baseplate is mounted to the wall.

The attachment element may include any suitable piece that is adapted for attaching a connector (such as a strap or a cord) and adapted to be attached to a base. The attachment element may be a unitary piece, or may be assembled from multiple pieces. The attachment element may have moving parts to grab, cinch, or clip a connector.

In some embodiments, the attachment element may be permanently attached to the baseplate. For example, after the attachment element is inserted through the back side of the baseplate and pivotably secured within the baseplate, a backing member (not shown) may be attached to the wall-facing side of the baseplate. According to one aspect of the disclosure, the attachment element is arranged to pivot relative to the baseplate. In some embodiments, the attachment element pivots about a pivot axis A defined by the pins 110 at the bottom of the attachment element. In some embodiments, as shown in FIG. 7, when the device 100 is mounted to a surface 120, the pivot axis A is horizontally extending. In some embodiments, the device is arranged to be able to pivot upwardly and downwardly when the device is mounted to the surface.

Figure 3:
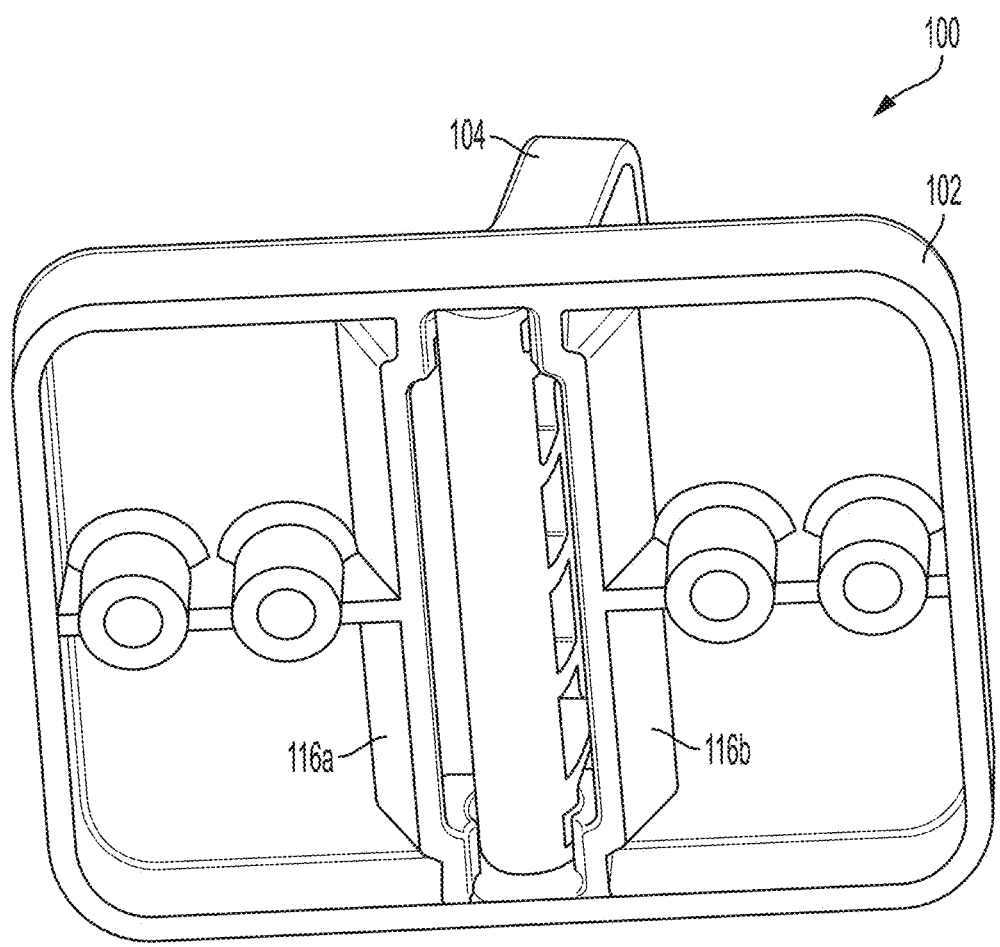
FIG. 3 is a bottom perspective view of the embodiment of FIG. 1.
Figure 6:
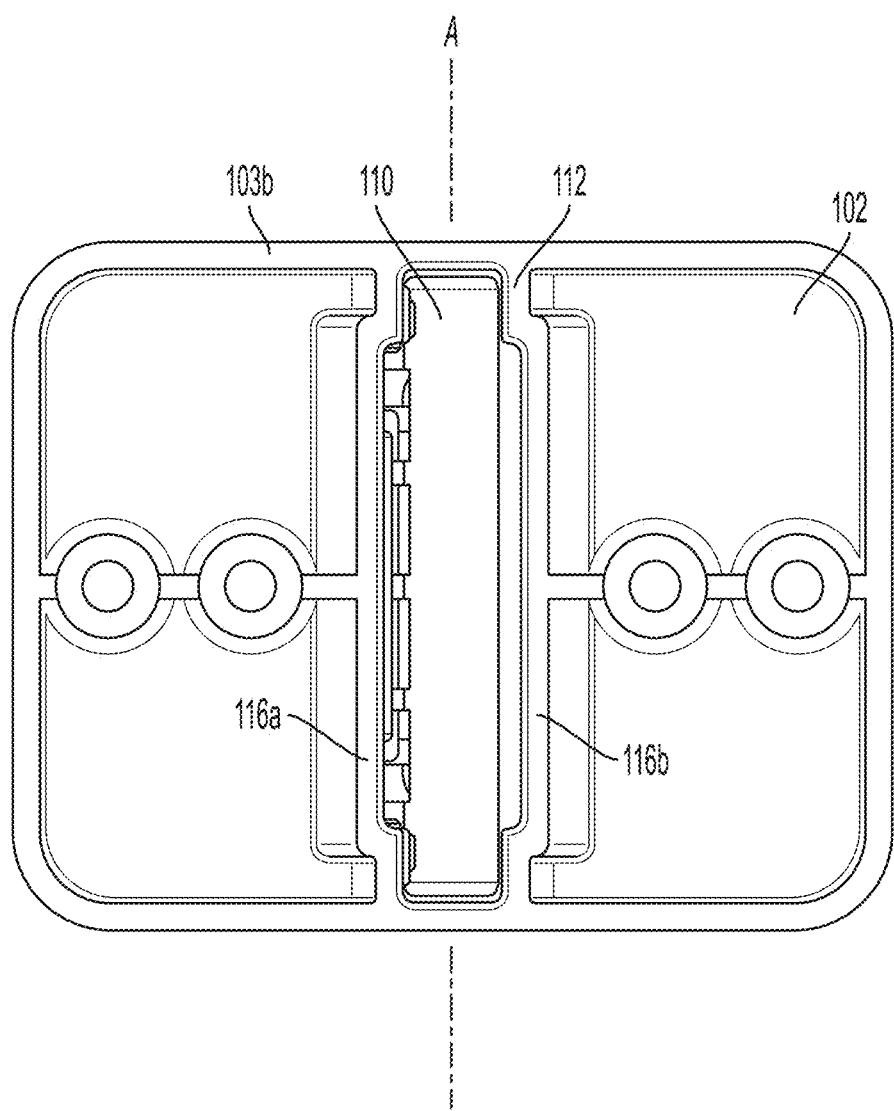
FIG. 6 is a bottom view of a furniture securing device according to one embodiment.

In some embodiments, the baseplate is arranged to control the degree of rotation of the attachment element. For example, in some embodiments, the device is arranged to allow the attachment element to pivot only downwardly or only upwardly. As shown in FIGS. 3, 5, and 6, in some embodiments, the recess is at least partially defined by first and second recess walls 116a, 116b. As shown in this view, the first recess wall is positioned opposite to a first side of the attachment element and the second recess wall is positioned opposite to a second, opposite side of the attachment element.

Figure 8:
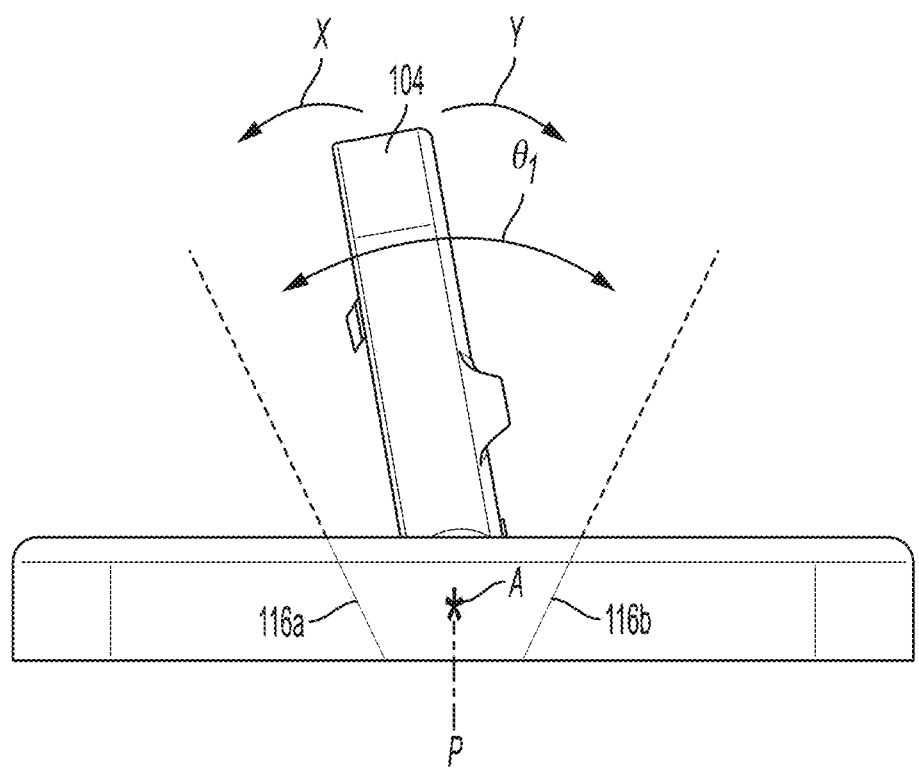
FIG. 8 is a side view of a furniture securing device according to one embodiment.

As shown in FIG. 8, when the attachment element moves in a first direction (see arrow X), the attachment element 104 may contact the first recess wall 116a if the attachment element is rotated greater than a certain angle of rotation. In a similar manner, when the attachment element moves in a second direction (see arrow Y), the attachment element may contact the second recess wall 116 if the attachment element is rotated greater than a certain angle of rotation.

In some embodiments, the first and second recess walls are formed at an angle relative to a plane P extending perpendicular to the pivot axis A. For example, as shown in FIG. 8, each of the first and second walls may be oriented at an angle of about 45 degrees relative to the plane, resulting in the first and second walls being perpendicular to each other. In such embodiments, the attachment element may rotate up to about 45 degrees towards the first recess wall 116a and up to about 45 degrees towards the second recess wall 116b. In that regard, the total degree of rotation $\theta_1$ of the attachment element is about 90 degrees.

Figure 9A:
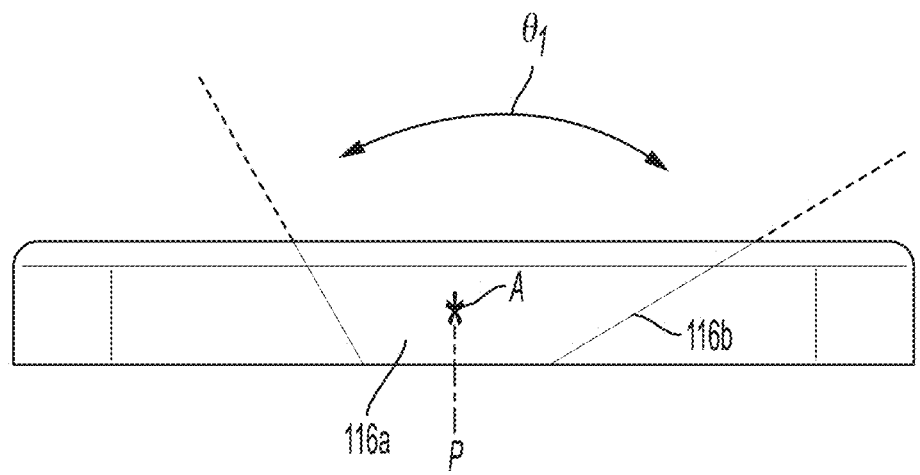
FIGS. 9A and 9B are side views of a baseplate of a furniture securing device according to various embodiments.

As will be appreciated, the first and second recess walls 116a, 116b may be oriented at other suitable angles while maintaining a total pivot swing angle of about 90 degrees. In some embodiments, the first and second recess walls need not be oriented at the same angle and need not allow the same degree of rotation to also maintain a total pivot swing angle of about 90 degrees. For example, as shown in FIG. 9A, the first recess wall 116a may be angled about 30 degrees relative to the plane and the second recess wall 116b may be angled about 60 degrees relative to the plane, resulting in first and second walls that are perpendicular to each other. In other embodiments, the walls may be arranged such that the walls are transverse to each other, but not perpendicular.

Figure 9B:
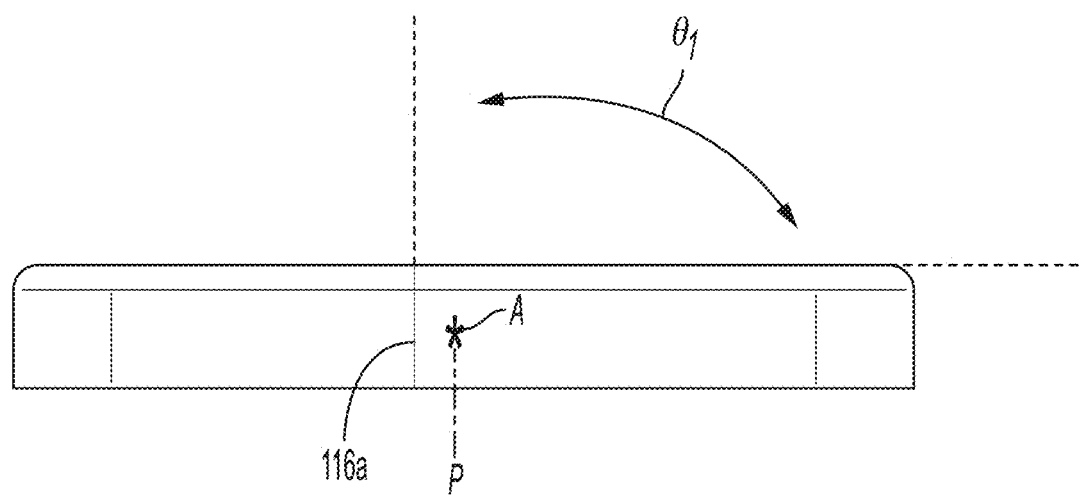

In some embodiments, the recess may be defined by one recess wall, such as the first recess wall 116a shown in FIG. 9B, while still maintaining the total degree of rotation $\theta_1$ of the attachment element of about 90 degrees. In this example, the first recess wall 116a is positioned substantially parallel to the plane, with the attachment element arranged to contact the top member of the base plate if the attachment element is rotated beyond about 90 degrees. As will be appreciated, in such an embodiment, when the device is mounted to a surface, the attachment element will rotate in either an upward or downward direction.

Figure 10A:
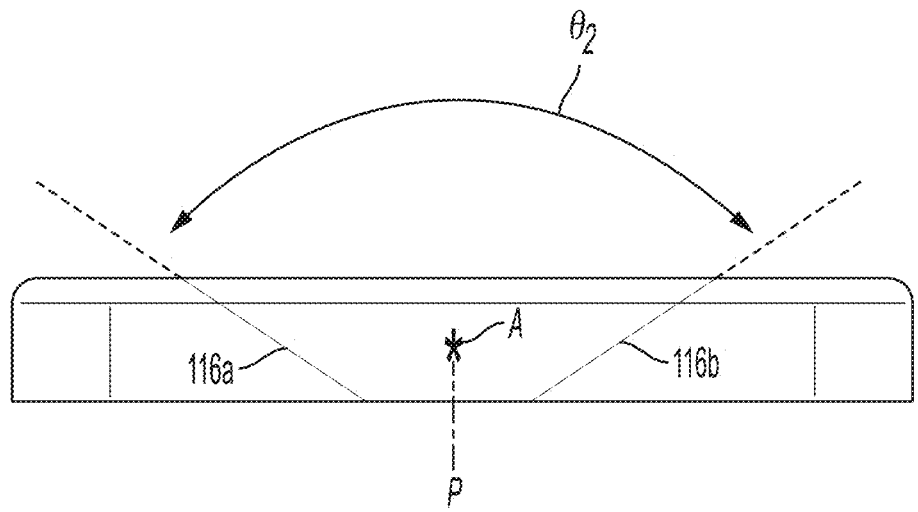
FIGS. 10A and 10B are schematic side views of a baseplate of a furniture securing device according to various embodiments.
Figure 10B:
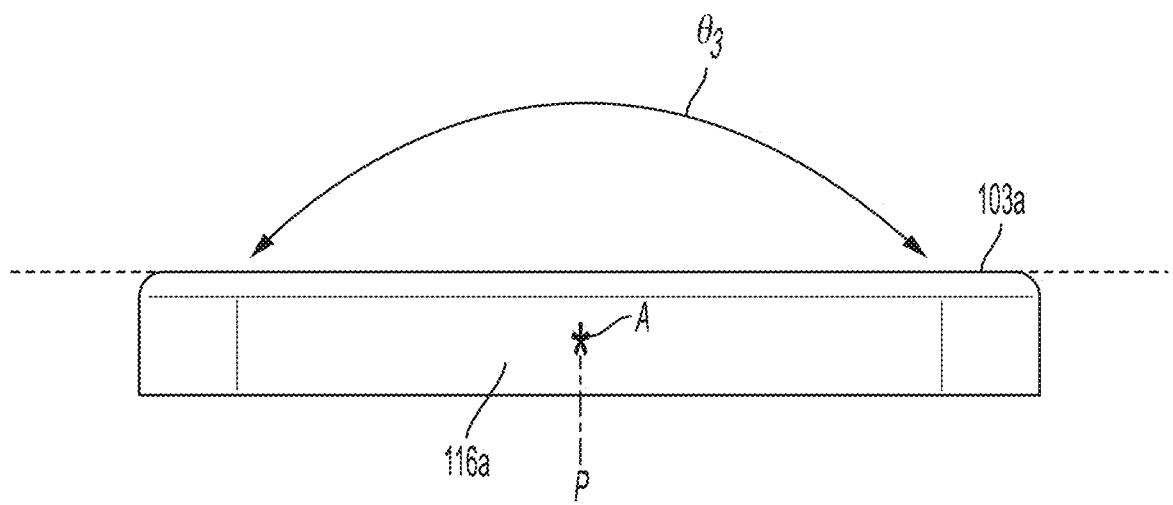

Although FIGS. 8 and 9A-9B are shown as permitting a total degree of rotation of the attachment element of about 90 degrees, in other embodiments, the degree of rotation may of the attachment element may be greater than 90 degrees. For example, as shown in FIG. 10A, the degree of rotation $\theta_2$ of the attachment element may be about 120 degrees, with each of the first and second recess walls 116a, 116b being oriented about 60 degrees relative to the plane P. In another embodiment, as shown in FIG. 10B, the degree of rotation $\theta_3$ of the attachment element may be about 170 degrees. In such an embodiment, the recess may not include first and second recess walls, such that the attachment element contacts only the top member when the attachment element pivots almost 90 degrees in either of the first and second directions (see arrows X and Y in FIG. 8). In still further embodiments, the front face of the baseplate may have a reduced thickness at the top and bottom so that the attachment element can pivot even closer to +90 degree and −90 degrees.

Although the attachment element is shown as having a total permitted swing angle of between about 90 and 180 degrees, it will be appreciated that the attachment element may be arranged to rotate at other suitable degrees. For example, the attachment element may be arranged to allow rotation of 150 degrees in other embodiments.

Figure 11:
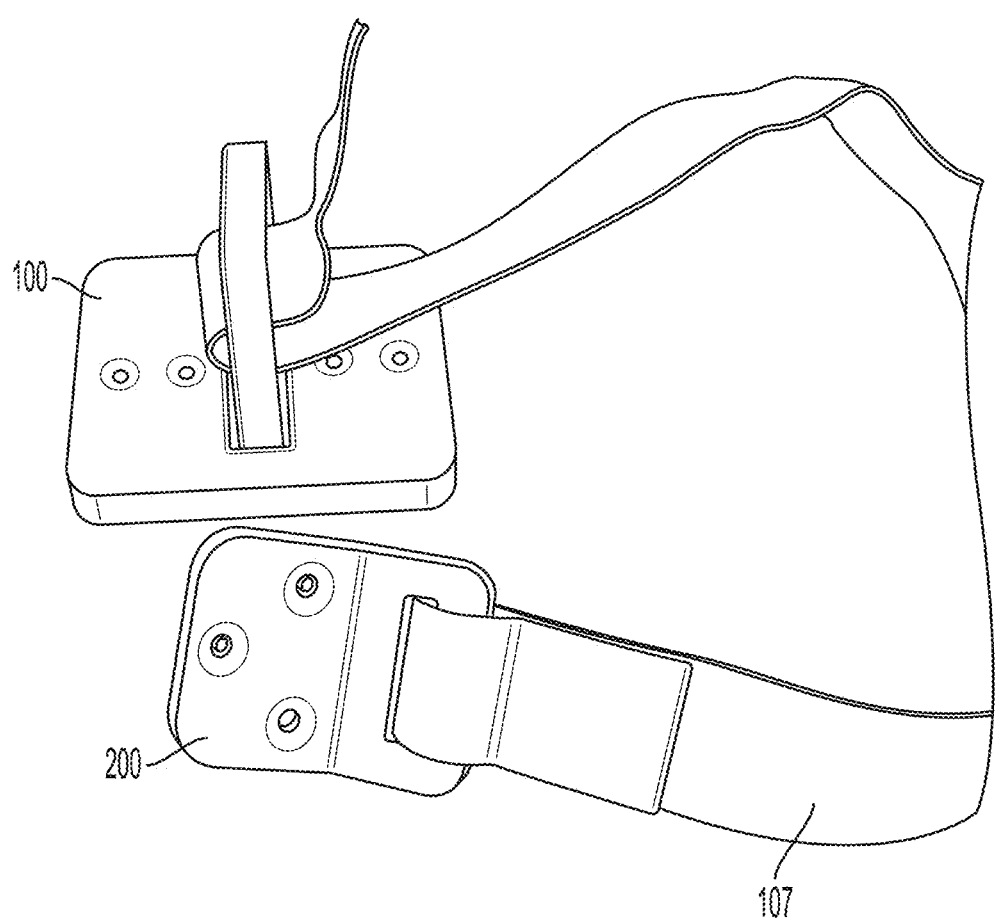
FIG. 11 is a furniture securing assembly according to one embodiment.

FIG. 11 illustrates a furniture securing assembly 300 which may be used to secure a piece of furniture to a surface, such as a wall. As shown in this view, the assembly 300 includes a first furniture securing device 100 attachable that is attachable to a second furniture securing device 200 via a strap 107. In some embodiments, the first and second furniture securing devices are similar to the devices describe above, each having an attachment element that is pivotally attached to a baseplate. In other embodiments, the first furniture securing device includes an attachment element that is pivotally attached to a baseplate and the second furniture securing device include only a mounting plate (e.g., no pivotally connected members).

In embodiments in which the first and second securing devices do not both include pivoting attachment elements, the first device (e.g., with the pivoting attachment element) may be arranged to be attached to the wall 120 while the second device (e.g., without the pivoting attachment element) may be arranged to be attached to a piece of furniture (see FIG. 7). In such embodiments, as shown in FIG. 7, the first device 100 may be positioned at or above the second device when the first and second devices are mounted.

A reverse embodiment includes the pivoting attachment element mounted to a piece of furniture while the non-pivoting attachment element is mounted to the wall.

In some embodiments, the first and second furniture securing devices are attached to one another via an adjustable strap. As will be appreciated, in such embodiments, the first and second devices may be mounted to the respective surfaces, with the strap being tightened after mounting. In other embodiments, the strap connecting the first and second devices may not be adjustable.

In some embodiments, the strap is arranged to pivot relative to the attachment element. In some embodiments, the attachment element includes a hinge element (such as a pin) that is rotationally locked relative to the attachment element, the hinge element pivots relative to a corresponding hinge element in the baseplate, and no elements within the baseplate rotate.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A furniture securing system comprising:
   a connector;
   a first base arranged to be mounted to a first surface, the first base including a first attachment element adapted to hold a first end of the connector; and
   a second base arranged to be mounted to a second surface, the second base including a second attachment element adapted to hold a second end of the connector;
   wherein the first attachment element pivots relative to the first base, and the first attachment element has a total pivot swing angle of 150 degrees or less.

2. The furniture securing device of claim 1, wherein the first attachment element has a total pivot swing angle of 120 degrees or less.

3. The furniture securing system of claim 1, wherein the first attachment element has a total pivot swing angle of 90 degrees or less.

4. The furniture securing system of claim 1, wherein the first attachment element has an upward pivot swing angle of 45 degrees and a downward pivot swing angle of 45 degrees.

5. The furniture securing system of claim 1, wherein the first attachment element has a downward pivot swing angle of 45 degrees and an upward pivot swing angle of zero degrees.

6. The furniture securing system of claim 1, wherein the first attachment element includes a pin, and the first base includes a snap-fit section to receive the pin.

7. The furniture securing system of claim 1, wherein the first base includes a recess on a front face of the first base within which a portion of the first attachment element rotates, the recess including first and second walls arranged at transverse angles to each other and on opposite sides of the first attachment element.

8. The furniture securing system of claim 7, wherein the first wall of the recess is arranged to prevent rotation of the first attachment element beyond a first rotation angle.

9. The furniture securing system of claim 8, wherein the second wall of the recess is arranged to prevent rotation of the first attachment element beyond a second rotation angle.

10. The furniture securing system of claim 1, wherein the first base includes a front face and one or more side members.

11. The furniture securing system of claim 10, wherein the first attachment element includes a pin, and when the first base is mounted to the first surface, the front face is positioned farther from the first surface than the pin.

12. The furniture securing system of claim 1, wherein, when the first base is mounted to the first surface, the first attachment element is not removable from the first base.

13. The furniture securing system of claim 1, wherein the first attachment element is removably attachable to the first base.

14. The furniture securing system of claim 1, wherein the first attachment element includes first and second pins.

15. The furniture securing system of claim 14, wherein the first and second pins are press fit into corresponding first and second channels.

16. A furniture securing assembly comprising:
    a first baseplate adapted to be mounted to a first surface;
    a first attachment element pivotally attached to the first baseplate, wherein the first attachment element includes first and second pins that engage with corresponding first and second recesses on the first baseplate to attach the first attachment element to the first baseplate, wherein the first attachment element has a total pivot swing angle of 150 degrees or less;

a second baseplate adapted to be mounted to a second surface;

a second attachment element attached to the second baseplate; and a connector attachable to each of the first attachment element and the second attachment element.

17. The furniture securing assembly of claim 16, wherein the first attachment element and the second attachment element are made of plastic.

18. The furniture securing assembly of claim 16, wherein the first attachment element is made of a single unitary piece.

19. The furniture securing assembly of claim 18, wherein the first baseplate is made of a single unitary piece.

20. A furniture securing device comprising:
a connector;
a first base arranged to be mounted to a first surface, the first base including a first attachment element adapted to hold a first end of the connector; and
a second base arranged to be mounted to a second surface, the second base including a second attachment element adapted to hold a second end of the connector;
wherein the first attachment element includes a first pin that pivots relative to the first base and wherein the first attachment element has a total pivot swing angle of 150 degrees or less.

21. The furniture securing device of claim 20, wherein the first pin is rotationally fixed to the first attachment element.

\* \* \* \* \*

UNITED STATES PATENT AND TRADEMARK OFFICE
CERTIFICATE OF CORRECTION

PATENT NO. : 11,357,328 B2
APPLICATION NO. : 16/646857
DATED : June 14, 2022
INVENTOR(S) : Andrew Marsden It is certified that error appears in the above-identified patent and that said Letters Patent is hereby corrected as shown below:

In the Claims

At Column 8, Claim 2, Line 13, replace "device" with --system--

Signed and Sealed this
Twenty-third Day of August, 2022

*Katherine Kelly Vidal*

Katherine Kelly Vidal
*Director of the United States Patent and Trademark Office*